(12) United States Patent
Huang et al.

(10) Patent No.: US 10,203,449 B2
(45) Date of Patent: Feb. 12, 2019

(54) LIGHT ASSEMBLY, BACKLIGHT MODULE AND LIQUID CRYSTAL DISPLAY

(71) Applicant: Radiant Opto-Electronics Corporation, Kaohsiung (TW)

(72) Inventors: Teng-Yi Huang, Kaohsiung (TW); Ming-Cheng Lin, Kaohsiung (TW); Yung-Chieh Chao, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 140 days.

(21) Appl. No.: 14/197,180

(22) Filed: Mar. 4, 2014

(65) Prior Publication Data

US 2015/0116628 A1 Apr. 30, 2015

(30) Foreign Application Priority Data

Oct. 25, 2013 (TW) .............................. 102138698 A

(51) Int. Cl.
*F21V 8/00* (2006.01)
*G02F 1/1333* (2006.01)
*G02F 1/1335* (2006.01)

(52) U.S. Cl.
CPC ......... *G02B 6/0088* (2013.01); *G02B 6/0091* (2013.01)

(58) Field of Classification Search
CPC ................................................... G02B 6/0088
See application file for complete search history.

(56) References Cited

U.S. PATENT DOCUMENTS

| 2001/0050731 | A1* | 12/2001 | An | G02B 6/0088 349/58 |
| 2002/0021382 | A1* | 2/2002 | Hasegawa | G02F 1/133308 349/58 |
| 2009/0051852 | A1 | 2/2009 | Chen et al. | |
| 2010/0253874 | A1* | 10/2010 | Ito | G02F 1/133308 349/58 |
| 2011/0051033 | A1* | 3/2011 | Shimizu | G02F 1/133308 349/58 |
| 2012/0249981 | A1 | 10/2012 | Hirosawa | |
| 2013/0044516 | A1* | 2/2013 | Yu | G02B 6/0088 362/612 |

(Continued)

FOREIGN PATENT DOCUMENTS

| CN | 102345818 A | 2/2012 |
| CN | 202266937 U | 6/2012 |

(Continued)

*Primary Examiner* — Edward Glick
*Assistant Examiner* — Anthony G Quash
(74) *Attorney, Agent, or Firm* — CKC & Partners Co., Ltd.

(57) ABSTRACT

A light assembly, a backlight module and a liquid crystal display are described. The light assembly includes a carrier, a light guide plate, a light source, a constraining member and a securing unit. The light guide plate is disposed on the carrier and has an incident surface. The light source which emits light towards the light guide plate and is adjacent to the incident surface of the light guide plate. The constraining member is disposed above the carrier and has a constraining surface. The securing unit is used to combine the constraining member with the carrier while the light guide plate is restrained against movement by the constraining surface of the constraining member.

12 Claims, 8 Drawing Sheets

(56) References Cited

U.S. PATENT DOCUMENTS

| | | | | |
|---|---|---|---|---|
| 2013/0194512 A1* | 8/2013 | Nishimoto | ........ | G02F 1/133308 348/790 |
| 2014/0028948 A1* | 1/2014 | Hsiao | ................ | G02F 1/133308 349/58 |
| 2014/0226080 A1* | 8/2014 | Tomomasa | ........... | G02B 6/0085 348/794 |
| 2015/0177449 A1* | 6/2015 | Uchida | ............. | G02F 1/133308 362/611 |
| 2015/0185540 A1* | 7/2015 | Ozeki | ............... | G02F 1/133308 348/739 |
| 2015/0277179 A1* | 10/2015 | Nishi | .................. | G02B 6/0088 349/58 |

FOREIGN PATENT DOCUMENTS

| | | |
|---|---|---|
| CN | 102736385 A | 10/2012 |
| CN | 102947639 A | 2/2013 |
| JP | 2008166005 A | 7/2008 |
| TW | 200846743 A | 12/2008 |
| TW | 200848855 A | 12/2008 |
| TW | 200944882 A | 11/2009 |
| WO | 2013031829 A1 | 3/2013 |

\* cited by examiner

LIGHT ASSEMBLY, BACKLIGHT MODULE AND LIQUID CRYSTAL DISPLAY

RELATED APPLICATIONS

This application claims priority to Taiwan Application Serial Number 102138698, filed Oct. 25, 2013, which is herein incorporated by reference.

BACKGROUND

Field of Invention

The present invention relates to a light source module. More particularly, the present invention relates to a light assembly, a backlight module and its application on a liquid crystal display.

Description of Related Art

Referring to FIG. 1, FIG. 1 is a schematic structural diagram showing a conventional backlight module 100. The conventional backlight module 100 includes a back plate 110, a light source 130, a light guide plate 150 and a frame 170. The light source 130 and the light guide plate 150 are disposed on the back plate 110. The frame 170 is engaged with the back plate 110 to secure the light guide plate 150.

However, after the conventional backlight module 100 has been used for a period of time, portions of the light guide plate 150 and the frame 170 near the light source 130 are deformed or warped due to being heated by the light source 130, thus expanding the frame 170. As a result, light emitted from the light source 130 will leak from the expanded frame 170 and affect the optical effect of the backlight module 100.

Referring to FIG. 2, FIG. 2 is a schematic structural diagram showing another conventional backlight module 200. The backlight module 200 shown in FIG. 2 is provided to improve the aforementioned problems. The backlight module 200 includes a back plate 210, a light source 230, a light guide plate 250 and a heat sink 270. The heat sink 270 is disposed on the back plate 210, and the light source 230 is disposed in the heat sink 270. Furthermore, the heat sink 270 is an integrated frame and has a cavity 270a, such that one side of the light guide plate 250 can be fixed in the cavity 270a.

In the structure of the backlight module 200, when a thickness of the light guide plate 250 is equal to an opening diameter of the cavity 270a, the light guide plate 250 can be prevented from warping caused by heat. However, the heat sink 270 is thick and heavy, and thus is disadvantageous to thinning and lightening the backlight module 200. Meanwhile, the size of the cavity 270a has to be well designed in advance during the manufacturing process, so as to match the thickness of the light guide plate 250 accurately, and thus is difficult to be manufactured. Furthermore, if errors occur during the manufacturing process, times and cost of rework will be increased. Meanwhile, it is difficult to assemble the backlight module 200. As shown in FIG. 2, while being engaged with the cavity 270a, the light guide plate 250 has to be inserted the cavity 270a inclinedly. Therefore, it is disadvantageous to the assemble of the big-sized light guide plate 250, and is likely to damage the light guide plate 250 during the assembling process, thus seriously affecting the yield rate of the backlight module 200.

SUMMARY

One aspect of the present invention is to provide a light assembly, a backlight module and a liquid crystal display, in which an adjustable securing unit is used to combine a constraining member with a carrier, and can adjust a distance between a constraining surface of the constraining member and a supporting surface of the carrier in accordance with thickness of a light guide plate. Meanwhile, the constraining member has the constraining surface. While being fastened into a second hole, a positioning member of the securing unit can be displaced within a first hole until the constraining surface restrains the light guide plate, so as to prevent the light guide plate from warping and increase the overall firmness of the backlight module. Furthermore, if a portion of the light guide plate is warped during a manufacturing process, the warped portion can be fixed and flattened by the constraining surface of the constraining member.

According to the aforementioned objects, the present invention provides a backlight module. The backlight module includes a carrier, a light guide plate, a light source, a constraining member and a securing unit. The light guide plate is disposed on the carrier. The light source is disposed on the carrier and emits light towards the light guide plate. The constraining member is disposed above the carrier and covers the light source, in which the constraining member includes a constraining surface, and the light guide plate is constrained by the constraining surface. The securing unit is used to combine the constraining member with the carrier. The securing unit includes a first hole, a second hole and a positioning member inserted into the first hole and the second hole fixed in the second hole. The positioning member is adjustable within the first hole while the first hole is aligned with the second hole until the light guide plate is restrained against movement by the constraining surface of the constraining member.

According to the aforementioned objects, the present invention provides a liquid crystal display. The liquid crystal display includes a backlight module and a liquid crystal panel. The backlight module includes a carrier, a light guide plate, a light source, a constraining member and a securing unit. The light guide plate is disposed on the carrier. The light source is disposed on the carrier and emits light towards the light guide plate. The constraining member is disposed above the carrier and covers the light source, in which the constraining member includes a constraining surface and a holding surface, and the light guide plate is constrained by the constraining surface. The securing unit is used to combine the constraining member with the carrier. The securing unit includes a first hole, a second hole and a positioning member inserted into the first hole and the second hole and fixed in the second hole. The positioning member is adjustable within the first hole while the first hole is aligned with the second hole until the light guide plate is restrained against movement by the constraining surface of the constraining member. The liquid crystal panel is disposed on the holding surface of the constraining member.

According to an embodiment of the present invention, the first hole is disposed on one of the constraining member and the carrier, and the second hole is disposed on the other one of the constraining member and the carrier.

According to an embodiment of the present invention, a size of the first hole is greater than a size of the second hole.

According to an embodiment of the present invention, the constraining member is adjustable towards the light guide plate along a first direction before the constraining member is combined with the carrier, and the first hole has a longitudinal axis parallel to the first direction, and the location of the positioning member within the first hole is adjustable along the longitudinal axis according to the movement of the constraining member.

According to an embodiment of the present invention, the carrier is a back plate or a heat sink.

According to an embodiment of the present invention, the constraining member is an aluminum extrusion constraining member, a galvanized steel constraining member, or a carbon fiber constraining member.

According to an embodiment of the present invention, the carrier includes a supporting surface and a mounting surface, in which the light guide plate is disposed on the supporting surface and the light source is disposed on the mounting surface.

According to the aforementioned objects, the present invention provides a light assembly. The light assembly includes a carrier, a light guide plate, a light source, a constraining member and a securing unit. The light guide plate is disposed on the carrier and has an incident surface. The light source which is adjacent to the incident surface of the light guide plate and emits light towards the light guide plate. The constraining member is disposed above the carrier and has a constraining surface. The securing unit is used to combine the constraining member with the carrier while the light guide plate is restrained against movement by the constraining surface of the constraining member.

According to an embodiment of the present invention, the securing unit includes a first hole, a second hole and a positioning member inserted into the first hole and fixed in the second hole, and the positioning member is adjustable within the first hole while the first hole is aligned with the second hole until the light guide plate is restrained against movement by the constraining surface of the constraining member.

According to an embodiment of the present invention, the first hole is disposed on one of the constraining member and the carrier, and the second hole is disposed on the other one of the constraining member and the carrier.

According to an embodiment of the present invention, a size of the first hole is greater than a size of the second hole.

According to an embodiment of the present invention, the constraining member is adjustable towards the light guide plate along a first direction before the constraining member is combined with the carrier, and the first hole has a longitudinal axis parallel to the first direction, and the location of the positioning member within the first hole is adjustable along the longitudinal axis according to the movement of the constraining member.

According to an embodiment of the present invention, the carrier includes a supporting surface and a mounting surface, in which the light guide plate is disposed on the supporting surface and the light source is disposed on the mounting surface.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
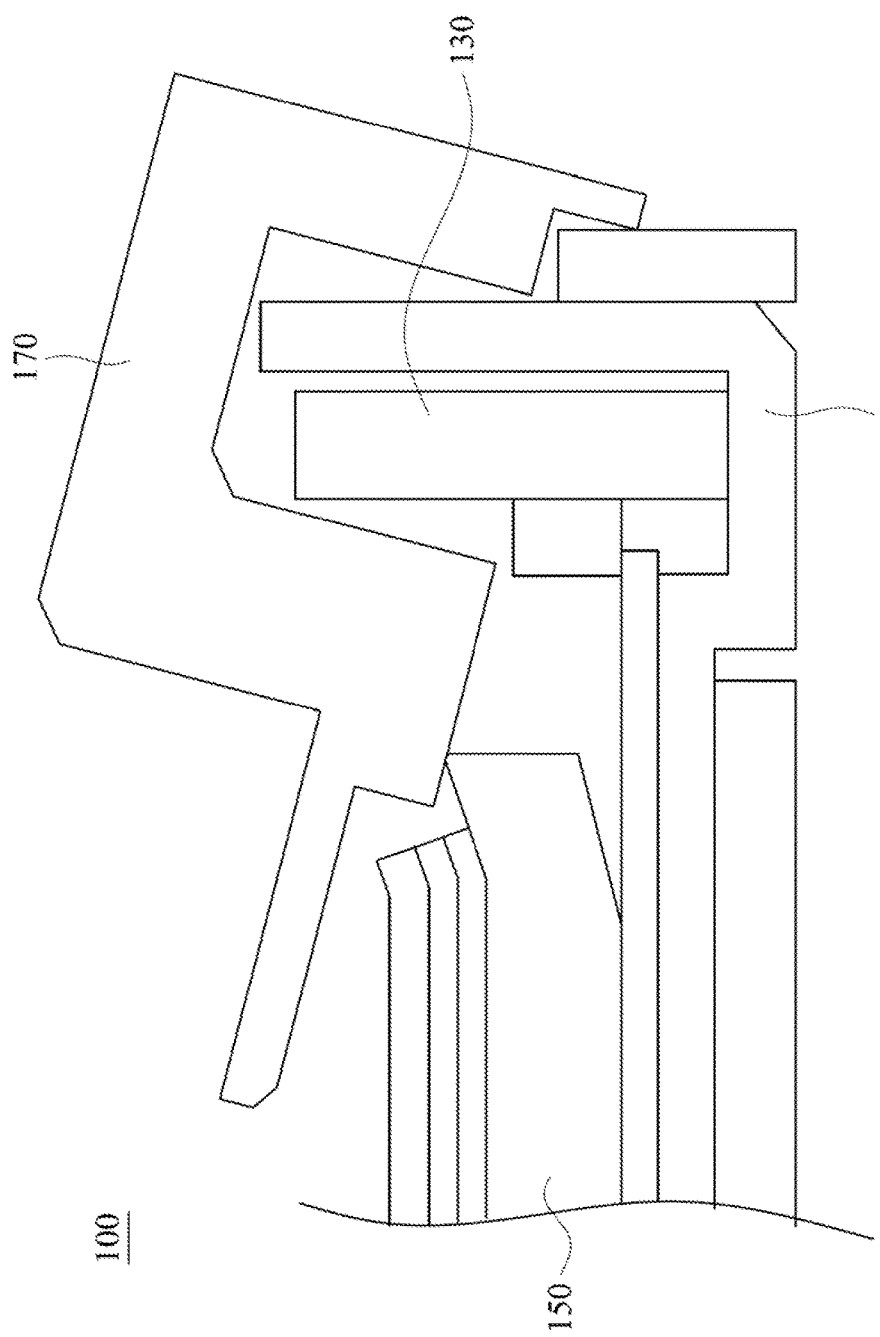
FIG. 1 is a schematic structural diagram showing a conventional backlight module.
Figure 2:
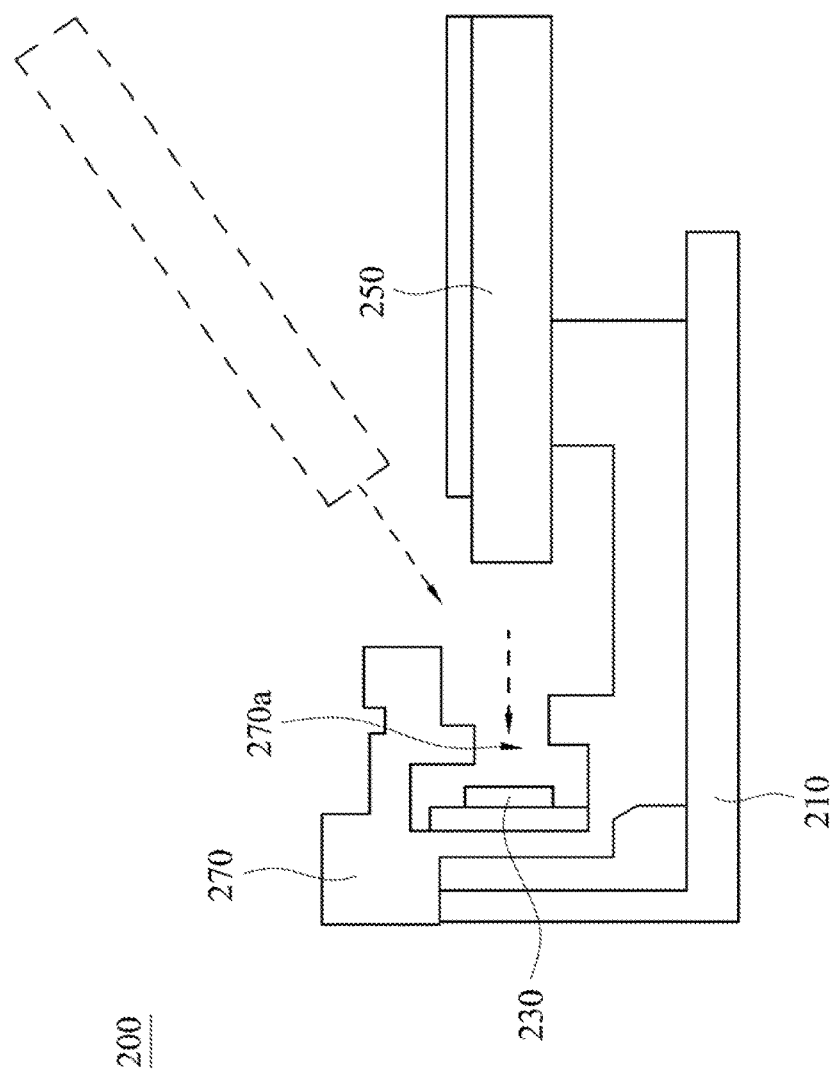
FIG. 2 is a schematic structural diagram showing another conventional backlight module.

Reference will now be made in detail to the present embodiments of the invention, examples of which are illustrated in the accompanying drawings. Wherever possible, the same reference numbers are used in the drawings and the description to refer to the same or like parts.

Figure 3:
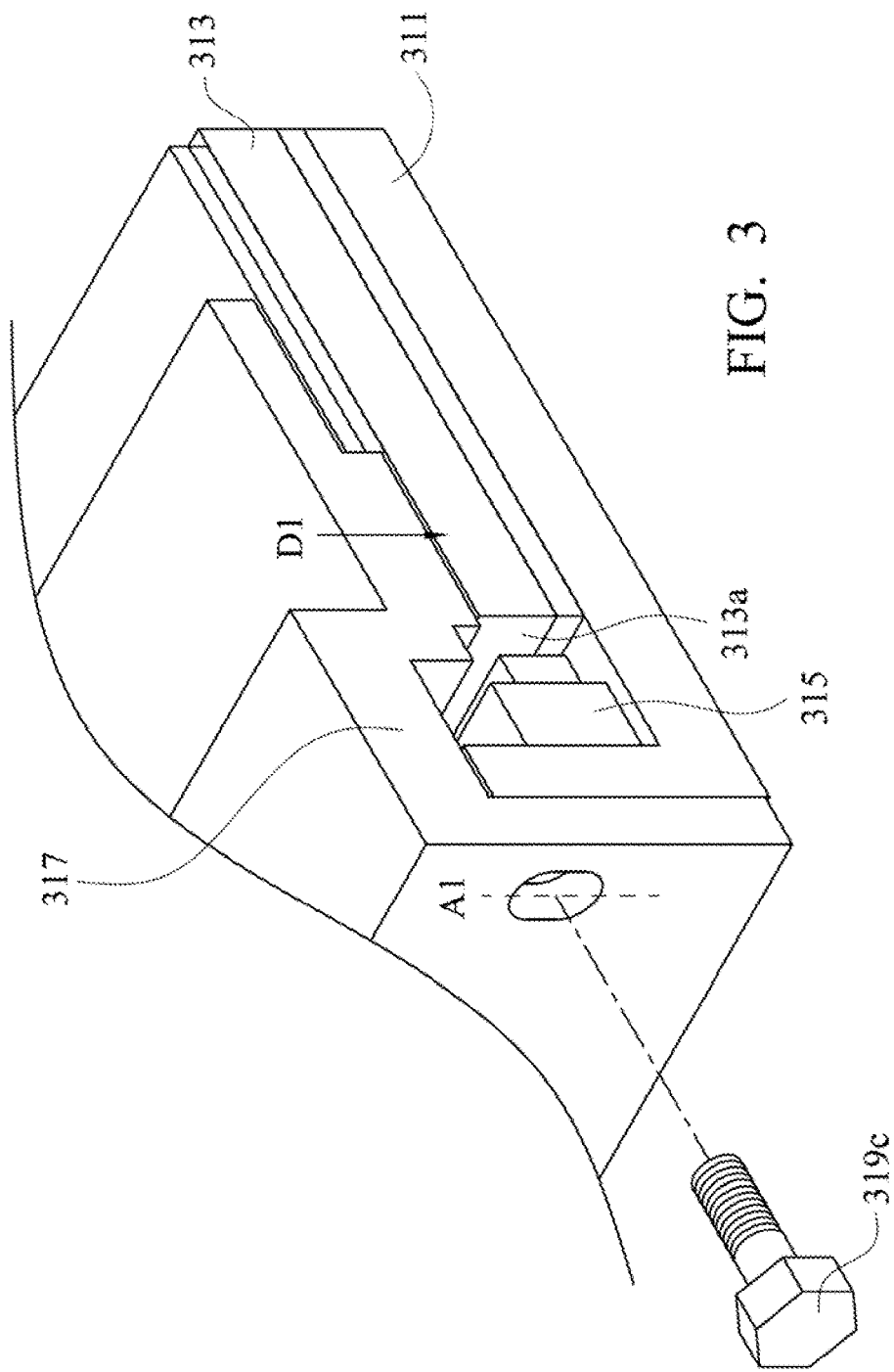
FIG. 3 is a schematic structural diagram showing a light assembly in accordance with an embodiment of the present invention.
Figure 4:
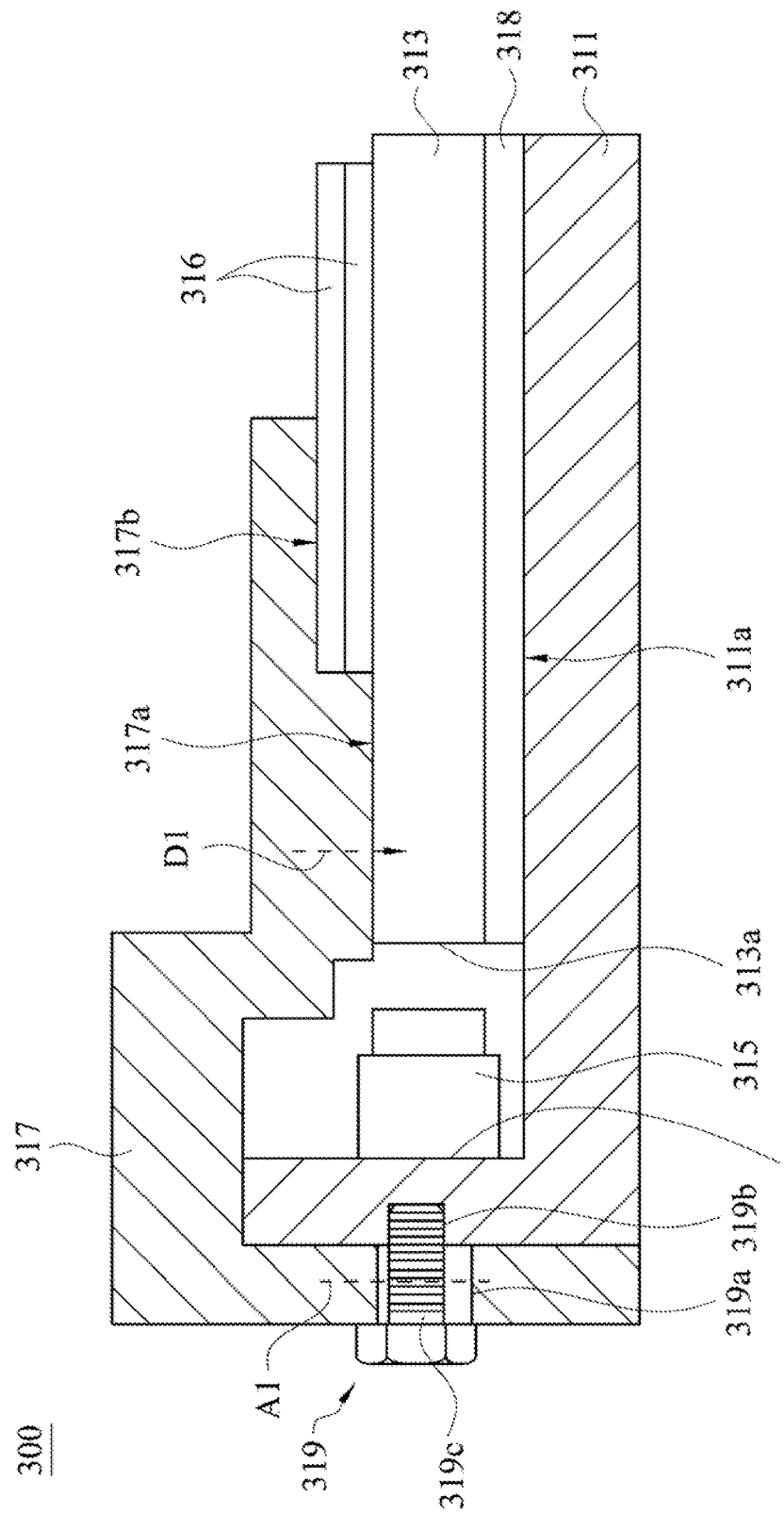
FIG. 4 is a schematic cross-sectional view of a light assembly in accordance with an embodiment of the present invention.

Referring to FIG. 3 and FIG. 4, FIG. 3 is a schematic structural diagram showing a light assembly 300 in accordance with an embodiment of the present invention, and FIG. 4 is a schematic cross-sectional view of the light assembly 300 in accordance with an embodiment of the present invention. In one embodiment, the light assembly 300 may be a backlight module, an illumination device or other equivalents. In the present embodiment, the light assembly 300 mainly includes a carrier 311, a light guide plate 313, a light source 315, a constraining member 317 and a securing unit 319. The carrier 311 has a supporting surface 311a and a mounting surface 311b. In one embodiment, the mounting surface 311b may be vertical to the supporting surface 311a, but is not limited thereto. The light guide plate 313 is disposed on the supporting surface 311a. The light guide plate 313 has an incident surface 313a. The light source 315 is disposed on the mounting surface 311b of the carrier 311. Meanwhile, the light source 315 is adjacent to the incident surface 313a of the light guide plate 313 and emits light towards the light guide plate 313. The constraining member 317 is disposed above the carrier 311 and covers the light source 315. The constraining member 317 has a constraining surface 317a and can be combined with the carrier 311 by using the securing unit 319. Moreover, the securing unit 319 is used to combine the constraining member 317 with the carrier 311 while the light guide plate 313 is restrained against movement by the constraining surface 317a of the constraining member 317. In other words, when the constraining member 317 is disposed on the carrier 311, the light guide plate 313 is directly constrained by the constraining surface 317a.

Referring to FIG. 3 and FIG. 4 again, in the present embodiment, the constraining member 317 and the carrier 311 are combined together by the securing unit 319. The securing unit 319 includes a first hole 319a, a fixing hole 319b and a fixing member 319c. In one embodiment, the first hole 319a is disposed on the constraining member 317, and the fixing hole 319b is disposed on the carrier 311. In one embodiment, a size of the first hole 319a is greater than that of the fixing hole 319b. In one example, the first hole 319a is a-through hole, and the first hole 319a may be a round hole, an elliptic-hole or an elongated hole. The fixing hole 319b is a-threaded hole, and the fixing member 319c is a screw which includes a head portion and a shank portion which can be screwed into the fixing hole 319b. After being inserted into the first hole 319a, the fixing member 319c is screwed into the fixing hole 319b.

Figure 5A:
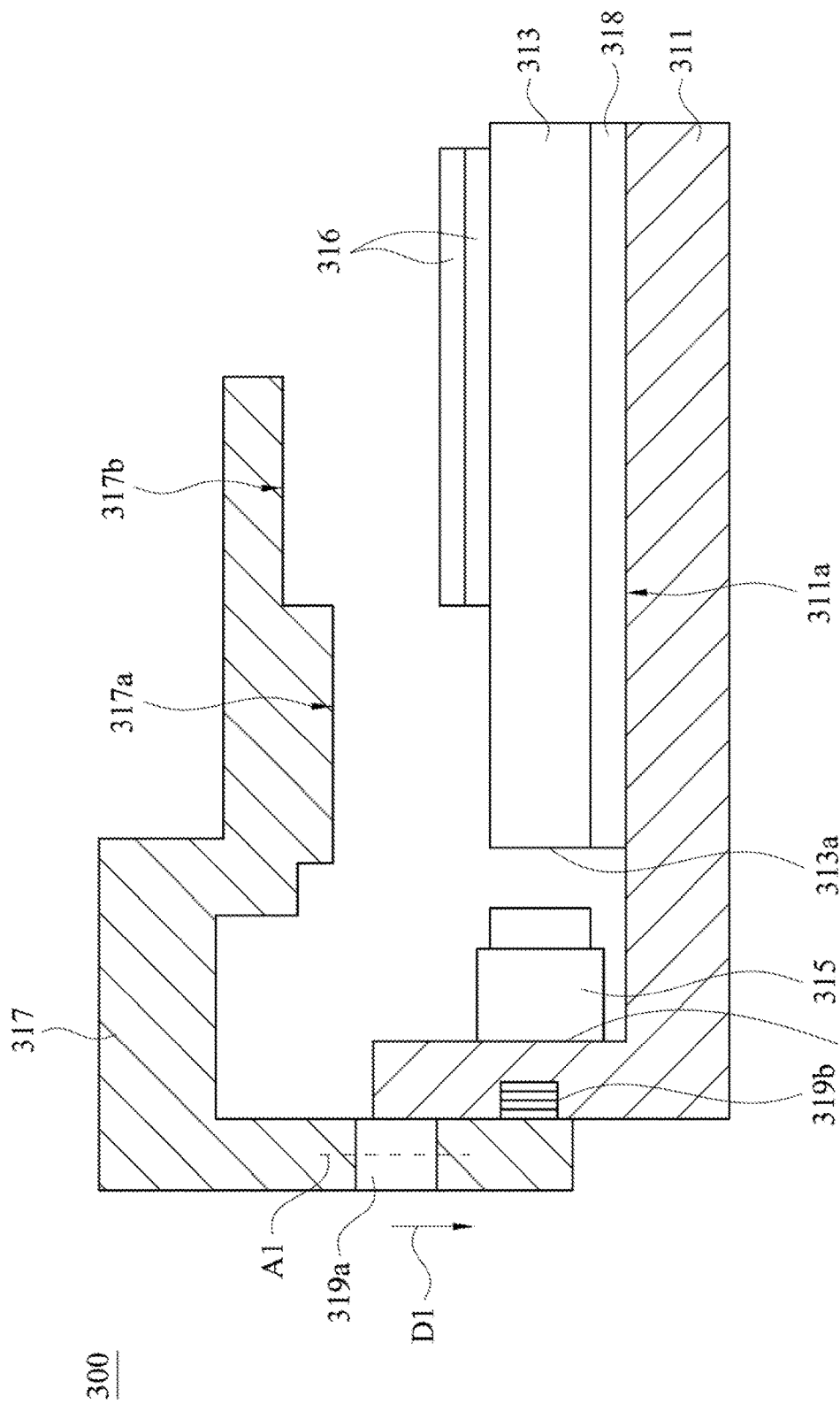
FIG. 5A-FIG. 5C are schematic cross-sectional diagrams showing a process for assembling a light assembly in accordance with an embodiment of the present invention.
Figure 5B:
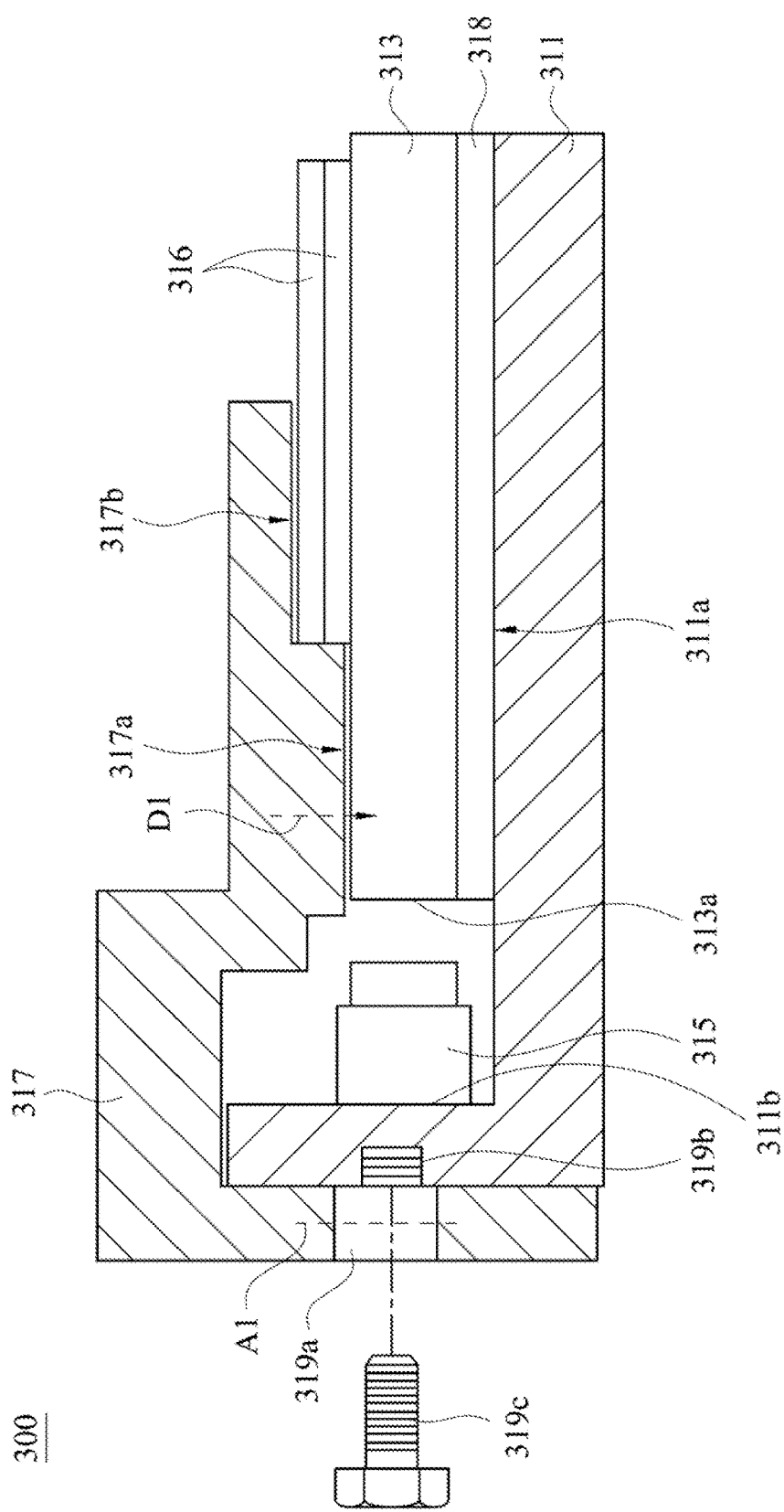
Figure 5C:
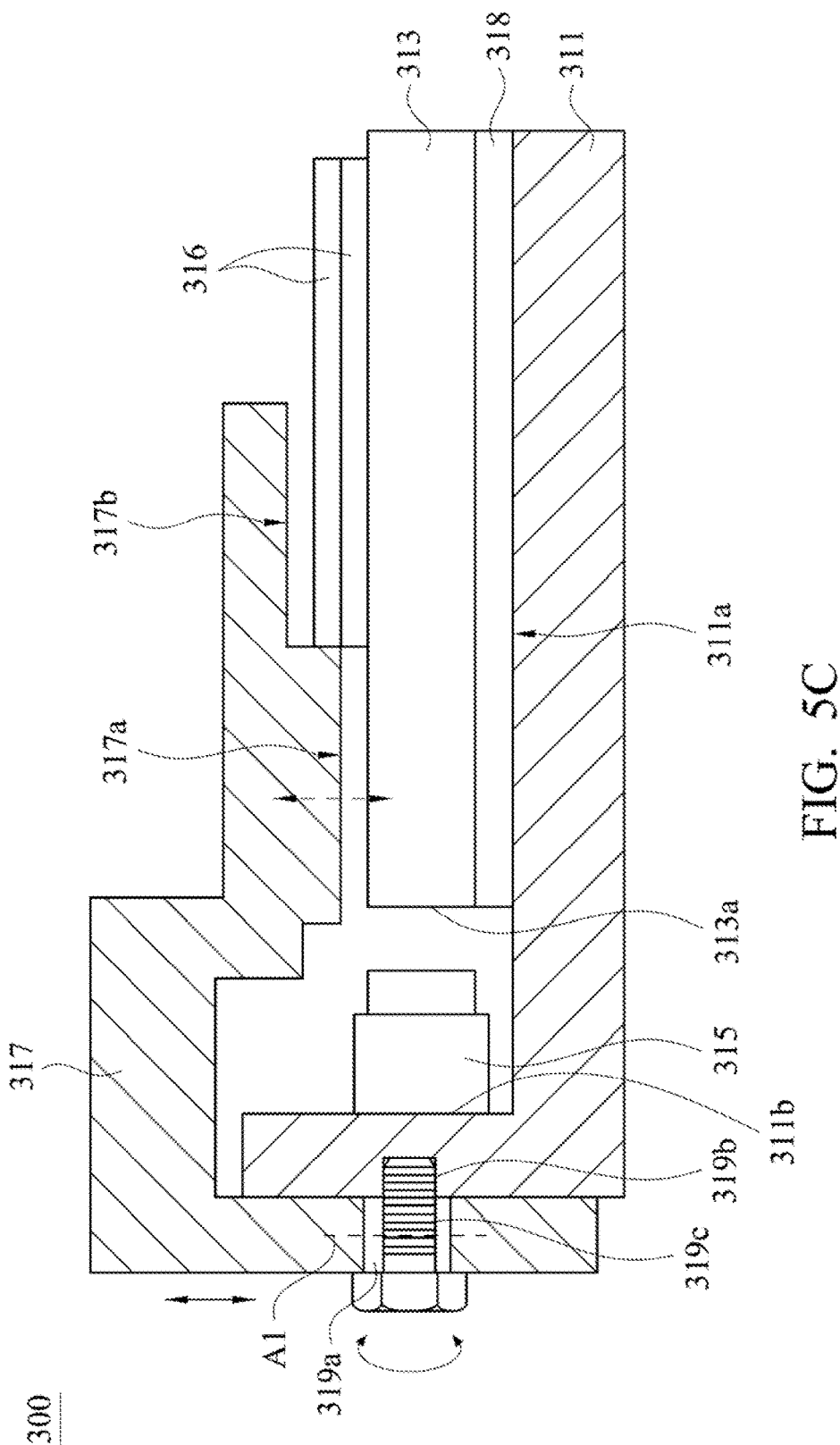

Referring to FIG. 4 and FIG. 5A-FIG. 5C, FIG. 5A-FIG. 5C are schematic cross-sectional diagrams showing a process for assembling a light assembly in accordance with an embodiment of the present invention. In the assembling process, after the light source 315 and the light guide plate 313 are disposed on the carrier 311, the constraining member 317 is disposed on the carrier 311 and the light guide plate 313 along a first direction D1 (as shown in FIG. 5A) in which the "first direction D1" means a direction vertically downwards. In other words, the constraining member 317 is adjustable towards the light guide plate 313 along the first direction D1 before the constraining member 317 is combined with the carrier 311. Meanwhile, the first hole 319a is overlapped with the fixing hole 319b (as shown in FIG. 5B). Thereafter, the fixing member 319c is inserted into the fixing hole 319a. Then, the fixing member 319c is fastened into the fixing hole 319b so as to secure the constraining member 317 on the carrier 311 (as shown in FIG. 5C). The first hole 319a has a longitudinal axis A1 parallel to the first direction D1. Because the size of the first hole 319a is greater than that of the fixing hole 319b, while being engaged with the fixing hole 319b, the fixing member 319c is allowed to displace vertically within the first hole 319a along the longitudinal axis A1 according to the movement of the constraining member 317, and thereby a distance between the constraining surface 317a of the constraining member 317 and the supporting surface 311a of the carrier 311 can be further adjusted until the constraining surface 317a of the constraining member 317 restrains the light guide plate 313, i.e. the constraining member 317 restrains light guide plate 313 along the first direction D1, and then the fixing member 319c is fixed in the carrier 311 (as shown in FIG. 4).

In one embodiment, an optical film 316 may be disposed on a light-emitting surface of the light guide plate 313, or a reflector 318 is disposed on a bottom surface of the light guide plate 313. In the present embodiment, the constraining member 317 further includes another constraining surface 317b. When the constraining surface 317a of the constraining member 317 is attached to the light guide plate 313, the constraining surface 317b is also attached to the optical film 316 at the same time, so as to effectively fix the optical film 316 and make the overall structure of the light assembly 300 to be firmer. In one embodiment, the constraining member 317 may be an aluminum extrusion constraining member, a galvanized steel constraining member, or a carbon fiber constraining member and thus has a greater stiffness than a conventional frame.

It is noted that, in the aforementioned embodiment, the first hole 319a is disposed on the constraining member 317, and the fixing hole 319b is disposed on the carrier 311. However, in some embodiments, the first hole 319a may also be disposed on the carrier 311, and the fixing hole 319b may also be disposed on the constraining member 317. Meanwhile, the carrier 311 may be a back plate or a heat sink, meaning that the fixing member 319c may be secured to the back plate or the heat sink. Therefore, any embodiment in which the securing unit 319 is disposed on constraining member 317 or the carrier 311 to adjust the constraining member 317 for restraining the light guide plate 214 falls within the scope of the present invention.

Figure 6:
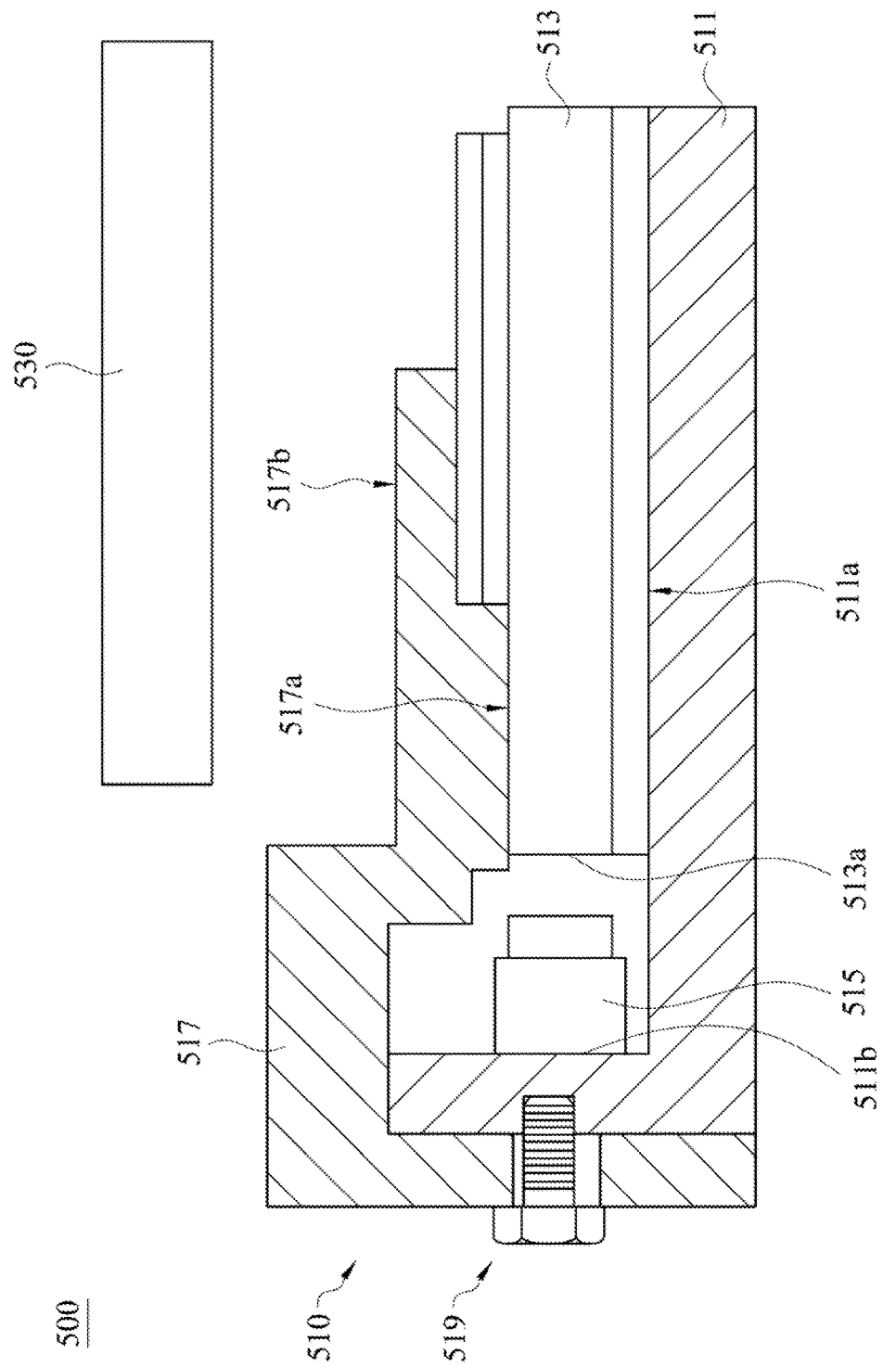
FIG. 6 is a schematic structural diagram showing a liquid crystal display in accordance with an embodiment of the present invention.

Referring to FIG. 6, FIG. 6 is a schematic structural diagram showing a liquid crystal display 500 in accordance with an embodiment of the present invention. In the present embodiment, the liquid crystal display 500 includes a backlight module 510 and a liquid crystal panel 530. The structure of the backlight module 510 in the present embodiment is similar to that of the light assembly 300. Therefore, the backlight module 510 also includes a carrier 511, a light guide plate 513, a light source 515, a constraining member 517 and a securing unit 519. The carrier 511 has a supporting surface 511a and a mounting surface 511b. The light guide plate 513 is disposed on the supporting surface 511a. The light guide plate 513 has an incident surface 513a. The light source 515 is disposed on the mounting surface 511b of the carrier 511 and emits light towards the incident surface 513a of the light guide plate 513. The constraining member 517 is disposed above the carrier 511 and covers the light source 515. The constraining member 517 has a constraining surface 517a. By using the securing unit 519, the constraining member 517 can be combined with the carrier 511 and restrains the light guide plate 513. Therefore, a distance between the constraining surface 517a of the constraining member 517 and the supporting surface 511a of the carrier 511 can be adjusted by using the securing unit 519 in accordance with a thickness of the light guide plate 513, thereby solving the warpage problem of the light guide plate 513. Meanwhile, the constraining member 517 has a holding surface 517b. The liquid crystal panel 530 is disposed on the holding surface 517b.

Referring to Table 1 and Table 2, Table 1 and Table 2 show respective optical effects of a conventional liquid crystal display and the liquid crystal display of the embodiment shown in FIG. 6. Table 1 shows the results of luminance and uniformity respectively measured from nine points on the conventional liquid crystal display, and Table 2 shows the results of luminance and uniformity respectively measured from nine points on the liquid crystal display of the embodiment of the present embodiment, in which the "nine points" are nine individual measuring points which are equidistantly spaced on the liquid crystal display, and the uniformity is calculated from the minimum luminance value of the nine points divided by the maximum luminance value of the nine points. For example, the uniformity of sample 1 is 1854/3093=59.94%.

TABLE 1

The results of luminance and uniformity respectively measured from nine points on the conventional liquid crystal display

| sample | luminance at each of nine points | | | average luminance | central luminance | uniformity |
|---|---|---|---|---|---|---|
| 1 | 2625 | 2937 | 3021 | 2625.1 | 2772 | 59.94% |
|   | 2578 | 2772 | 3093 | | | |
|   | 1854 | 2274 | 2472 | | | |
| 2 | 3265 | 2908 | 3241 | 2938.0 | 2698 | 71.16% |
|   | 3212 | 2698 | 3349 | | | |
|   | 2480 | 2383 | 2906 | | | |
| 3 | 3184 | 3053 | 3351 | 3648.2 | 3671 | 66.05% |
|   | 3707 | 3671 | 4465 | | | |
|   | 3322 | 3459 | 4622 | | | |

TABLE 2

The results of luminance and uniformity respectively measured from nine points on the liquid crystal display of the embodiment of the present invention

| sample | luminance at each of nine points | | | average luminance | central luminance | uniformity |
|---|---|---|---|---|---|---|
| 4 | 4611 | 4433 | 4505 | 4378.4 | 4534 | 83.04% |
|   | 4711 | 4534 | 4639 | | | |
|   | 4042 | 3912 | 4019 | | | |
| 5 | 5041 | 5045 | 5046 | 4934.3 | 5194 | 84.00% |
|   | 5235 | 5194 | 5243 | | | |
|   | 4557 | 4404 | 4644 | | | |

TABLE 2-continued

The results of luminance and uniformity respectively measured from nine points on the liquid crystal display of the embodiment of the present invention

| sample | luminance at each of nine points | | | average luminance | central luminance | uniformity |
|---|---|---|---|---|---|---|
| 6 | 5315 | 5172 | 5219 | 5210.6 | 5570 | 85.78% |
|  | 5582 | 5570 | 5571 |  |  |  |
|  | 4869 | 4788 | 4809 |  |  |  |

It can be known from Table 1 that, after the conventional liquid crystal display has been used for a period of time, a portion of a light guide plate in the conventional liquid crystal display near a light source is warped because of the heat, thus resulting in an expanded frame of the liquid crystal display. Therefore, the overall luminance and uniformity of the conventional liquid crystal display are decreased accordingly. Calculated from Table 1 that, it can be known that an average value of the average luminance values of samples 1, 2 and 3 is 3070; an average value of the central luminance values of samples 1, 2 and 3 is 3047; and an average value of the uniformity values of sample 1, 2 and 3 is 65.72%. However, calculated from Table 2 that, it can be known that an average value of the average luminance values of samples 4, 5 and 6 is 4841; an average value of the central luminance values of samples 4, 5 and 6 is 5099; and an average value of the uniformity values of samples 4, 5 and 6 is 84.27%. Accordingly, compared with the conventional liquid crystal display, the average value of the average luminance values of the present embodiment is increased by 57.6%, the average value of the central luminance values of the present embodiment is increased by 67.3%, and the average value of the uniformity values is increased by 28.1%.

According to the aforementioned embodiments of the present invention, by using the adjustable securing unit to combine the constraining member with the carrier, the distance between the constraining surface of the constraining member and the supporting surface of the carrier can be adjusted in accordance with the thickness of the light guide plate. The constraining member has the constraining surface and thus, while being fastened into the fixing hole, the fixing member can be displaced within the first hole until the constraining surface restrains the light guide plate, thus preventing the light guide plate from be deformed by heat, and increasing the firmness of the backlight module. Furthermore, if a portion of the light guide plate is warped during a manufacturing process, the warped portion can be fixed and flattened by the constraining surface of the constraining member.

According to the aforementioned embodiments of the present invention, the constraining member of the present invention may be an aluminum extrusion constraining member, a galvanized steel constraining member, or a carbon fiber constraining member with better stiffness. Therefore, since the overall firmness of the backlight module can be increased, the constraining member of the present invention can be applied on a backlight module with a bigger size or a narrower frame width without needing to additionally increase the volume or size of the constraining member, so as to achieve an object of thinning and lightening the backlight module.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module, comprising:
a light guide plate having an upper surface and a lower surface which extend along a horizontal direction;
a carrier comprising a horizontal section which supports the lower surface of the light guide plate, and a vertical section which is substantially vertical to the horizontal direction, wherein the carrier is formed with a threaded hole that extends inwardly in the horizontal direction from an outer surface of the vertical section;
a light source which is disposed on the carrier and emits light towards the light guide plate;
a constraining member which is disposed above the carrier and covers the light source, wherein the constraining member comprises a first section having a constraining surface which is operable to constrain the light guide plate by abutting against the upper surface thereof, and a second section which extends vertically in the vertical direction and abuts against the outer surface of the vertical section of the carrier, wherein the second section of the constraining member is formed with a through hole that extends therethrough in the horizontal direction, wherein the through hole is larger than the fixing hole; and
a fixing member passing through the through hole in the second section of the constraining member, wherein the fixing member is used to fix the constraining member to the carrier;
wherein the fixing member comprises a head portion, and the head portion directly contacts and restrains against an outer surface of the second section of the constraining member; and
wherein the second section of the constraining member is sandwiched between the head portion of the fixing member and the vertical section of the carrier without being supported by other components.

2. The backlight module of claim 1, wherein the carrier is a back plate or a heat sink.

3. The backlight module of claim 1, wherein the light guide plate is disposed on the horizontal section of the carrier and the light source is disposed on the vertical section of the carrier.

4. The backlight module of claim 1, wherein the constraining member is an aluminum extrusion constraining member, a galvanized steel constraining member, or a carbon fiber constraining member.

5. A liquid crystal display, comprising:
a backlight module of claim 1; and
a liquid crystal panel disposed on the constraining member.

6. A backlight module, comprising:
a light guide plate having an upper surface and a lower surface which extend along a horizontal direction;
a carrier comprising a horizontal section which supports the lower surface of the light guide plate, and a vertical section which is substantially vertical to the horizontal direction, wherein the carrier is formed with a fixing hole that extends inwardly in the horizontal direction from an outer surface of the vertical section;

a light source which is disposed on the carrier and emits light towards the light guide plate;

a constraining member which is disposed above the carrier and covers the light source, wherein the constraining member comprises a first section having a constraining surface which is operable to constrain the light guide plate by abutting against the upper surface thereof, and a second section which extends vertically in the vertical direction and abuts against the outer surface of the vertical section of the carrier, wherein the second section of the constraining member is formed with a through hole that extends therethrough in the horizontal direction, wherein the through hole is larger than the fixing hole; and a fixing member passing through the through hole in the second section of the constraining member, wherein the fixing member is used to fix the constraining member to the carrier;

wherein the fixing member comprises a head portion and a shank portion, wherein the head portion directly contacts an outer surface of the second section of the constraining member;

wherein a length of the shank portion of the fixing member is smaller than a thickness of the second section of the constraining member plus a thickness of the vertical section of the carrier.

7. The backlight module of claim 6, wherein the carrier is a back plate or a heat sink.

8. The backlight module of claim 6, wherein the constraining member is an aluminum extrusion constraining member, a galvanized steel constraining member, or a carbon fiber constraining member.

9. The backlight module of claim 6, wherein the constraining member is movable relative to the carrier until the constraining surface restrains against the light guide plate prior to the constraining member is secured by the fixing member.

10. The backlight module of claim 6, wherein the shank portion is fixed in the fixing hole of the carrier.

11. A liquid crystal display, comprising:
a backlight module of claim 6; and
a liquid crystal panel disposed on the constraining member.

12. The backlight module of claim 6, wherein the light guide plate is disposed on the horizontal section of the carrier and the light source is disposed on the vertical section of the carrier.

* * * * *